US012189815B1

(12) United States Patent
Scotney et al.

(10) Patent No.: US 12,189,815 B1
(45) Date of Patent: *Jan. 7, 2025

(54) SELECTIVE REPLACEMENT OF DATA MAINTAINED BY THIRD-PARTY NETWORK SERVICES

(71) Applicant: StratoKey Pty Ltd., Hobart (AU)

(72) Inventors: Anthony Scotney, Hobart (AU); Sabyasachi Routray, Hobart (AU)

(73) Assignee: STRATOKEY PTY LTD, Hobart (AU)

( * ) Notice: Subject to any disclaimer, the term of this patent is extended or adjusted under 35 U.S.C. 154(b) by 504 days.

This patent is subject to a terminal disclaimer.

(21) Appl. No.: 17/520,541

(22) Filed: Nov. 5, 2021

Related U.S. Application Data

(63) Continuation-in-part of application No. 17/189,058, filed on Mar. 1, 2021, now Pat. No. 11,755,777,
(Continued)

(51) Int. Cl.
*G06F 21/62* (2013.01)
*G06F 16/22* (2019.01)
(Continued)

(52) U.S. Cl.
CPC .......... *G06F 21/6254* (2013.01); *G06F 16/22* (2019.01); *G06F 16/258* (2019.01);
(Continued)

(58) Field of Classification Search
CPC .... G06F 21/6254; G06F 16/22; G06F 16/258; G06F 16/90344; G06F 16/908;
(Continued)

(56) References Cited

U.S. PATENT DOCUMENTS

| 6,829,638 B1 | 12/2004 | McBrearty |
| 7,788,407 B1 | 8/2010 | Venkat |

(Continued)

FOREIGN PATENT DOCUMENTS

| CN | 101398871 A | 4/2009 |

OTHER PUBLICATIONS

"Linh et al. Compliance monitoring in business processes: Functionalities, application and tool-support. Information Systems. vol. 54. Dec. 2015. 3 Pages. https://www.sciencedirect.com/science/article/pii/S0306437915000459 (Year: 2015)".

(Continued)

*Primary Examiner* — Cheng-Feng Huang
(74) *Attorney, Agent, or Firm* — Mahamedi IP-Law LLP

(57) ABSTRACT

A network computer system to selectively anonymize data items of a collection of data structures, where the network computer system is implemented as a backend web service. The network computer system receives a first web service call from a third-party network service, identifies a character string in a data item that has a format that coincides with the particular format, select a token from a token pool, and provides a response to the first web service call that causes the third-party network service to store a modified data item, where the modified data item is generated by replacing the character string in the data item with the token.

20 Claims, 6 Drawing Sheets

Related U.S. Application Data which is a continuation of application No. 16/221,261, filed on Dec. 14, 2018, now Pat. No. 10,936,751.

(51) Int. Cl.
  *G06F 16/25* (2019.01)
  *G06F 16/903* (2019.01)
  *G06F 16/908* (2019.01)
  *G06F 40/284* (2020.01)
  *H04L 9/40* (2022.01)

(52) U.S. Cl.
  CPC ...... *G06F 16/90344* (2019.01); *G06F 16/908* (2019.01); *G06F 21/6227* (2013.01); *G06F 40/284* (2020.01); *H04L 63/0421* (2013.01); *G06F 2221/2115* (2013.01)

(58) Field of Classification Search
  CPC .............. G06F 21/6227; G06F 40/284; G06F 2221/2115; H04L 63/0421
  See application file for complete search history.

(56) References Cited

U.S. PATENT DOCUMENTS

| | | |
|---|---|---|
| 8,437,744 B1 | 5/2013 | Heins |
| 8,566,247 B1 | 10/2013 | Nagel |
| 8,768,307 B1 | 7/2014 | Heins |
| 9,076,004 B1 | 7/2015 | Bogorad |
| 9,197,673 B1 | 11/2015 | Gaddy |
| 9,794,061 B1 | 10/2017 | Bushman |
| 9,910,745 B1 | 3/2018 | Lukkor |
| 9,953,309 B2 | 4/2018 | Carlson |
| 10,360,243 B2 * | 7/2019 | Ukai ................. G06F 16/86 |
| 10,372,926 B1 | 8/2019 | Leshinsky |
| 10,447,710 B1 | 10/2019 | Li |
| 10,594,721 B1 | 3/2020 | Scotney |
| 10,798,064 B1 | 10/2020 | Scotney |
| 10,826,946 B2 * | 11/2020 | Bykampadi ......... H04L 63/0281 |
| 10,880,322 B1 | 12/2020 | Jakobsson |
| 10,936,751 B1 | 3/2021 | Scotney |
| 10,963,590 B1 * | 3/2021 | Dash ................. G06F 21/604 |
| 11,042,506 B2 | 6/2021 | Aksionkin |
| 11,089,126 B1 | 8/2021 | Scotney |
| 11,416,874 B1 * | 8/2022 | Scotney ............... G06F 16/213 |
| 11,503,067 B2 * | 11/2022 | Kras .................. H04L 63/1483 |
| 11,783,349 B2 | 10/2023 | Scotney |
| 2002/0128925 A1 | 9/2002 | Angeles |
| 2003/0079120 A1 | 4/2003 | Hearn |
| 2003/0200331 A1 | 10/2003 | Mahajan |
| 2004/0024826 A1 | 2/2004 | Halahmi |
| 2005/0132286 A1 | 6/2005 | Rohrabaugh |
| 2006/0004719 A1 | 1/2006 | Lawrence |
| 2006/0149590 A1 | 7/2006 | Palmer |
| 2006/0253594 A1 | 11/2006 | Szabo |
| 2007/0300057 A1 | 12/2007 | Corcoran |
| 2008/0301805 A1 | 12/2008 | Bharara |
| 2009/0063952 A1 | 3/2009 | Raghavachari |
| 2009/0217354 A1 | 8/2009 | Blum |
| 2010/0071052 A1 | 3/2010 | Mao |
| 2010/0088389 A1 | 4/2010 | Buller |
| 2010/0198917 A1 | 8/2010 | Petersen |
| 2012/0030294 A1 | 2/2012 | Piermot |
| 2012/0117458 A1 | 5/2012 | Holloway |
| 2012/0143968 A1 | 6/2012 | Oren |
| 2012/0179787 A1 | 7/2012 | Walsh |
| 2012/0324113 A1 | 12/2012 | Prince |
| 2013/0346453 A1 | 12/2013 | Procopio |
| 2014/0006357 A1 | 1/2014 | Davis |
| 2014/0046906 A1 | 2/2014 | Patiejunas |
| 2014/0095865 A1 | 4/2014 | Yerra |
| 2014/0122866 A1 | 5/2014 | Haeger |
| 2014/0129457 A1 | 5/2014 | Peeler |
| 2014/0229729 A1 | 8/2014 | Roth |
| 2014/0282936 A1 | 9/2014 | Fitzgerald |
| 2014/0337614 A1 | 11/2014 | Kelson |
| 2015/0006890 A1 | 1/2015 | Roth |
| 2015/0039887 A1 | 2/2015 | Kahol |
| 2015/0067881 A1 | 3/2015 | Badstieber |
| 2015/0249684 A1 | 9/2015 | Zhang |
| 2015/0278545 A1 | 10/2015 | Bigras |
| 2016/0004729 A1 | 1/2016 | Evans |
| 2016/0019224 A1 | 1/2016 | Ahn |
| 2016/0087933 A1 | 3/2016 | Johnson |
| 2016/0171227 A1 | 6/2016 | Margolin |
| 2016/0217269 A1 | 7/2016 | Goettges |
| 2016/0226844 A1 | 8/2016 | Pecka |
| 2016/0234330 A1 | 8/2016 | Popowitz |
| 2016/0261668 A1 | 9/2016 | Joel |
| 2016/0269371 A1 | 9/2016 | Coimbatore |
| 2017/0034100 A1 | 2/2017 | Zink |
| 2017/0201526 A1 | 7/2017 | Yehuda |
| 2017/0223003 A1 * | 8/2017 | Miles .................. H04L 63/02 |
| 2017/0236129 A1 | 8/2017 | Kholkar |
| 2017/0243028 A1 | 8/2017 | LaFever |
| 2017/0286437 A1 | 10/2017 | Stevens |
| 2018/0025011 A1 | 1/2018 | Aksionkin |
| 2018/0063117 A1 | 3/2018 | Tseng |
| 2019/0236283 A1 | 8/2019 | Koster |
| 2019/0286850 A1 | 9/2019 | Popescu |
| 2020/0065523 A1 | 2/2020 | Fukuda |
| 2020/0073940 A1 | 3/2020 | Grosset |
| 2020/0175484 A1 | 6/2020 | Kumar |
| 2020/0213345 A1 | 7/2020 | Scotney |
| 2020/0236187 A1 | 7/2020 | Tal |
| 2021/0021573 A1 | 1/2021 | Scotney |
| 2021/0344770 A1 | 11/2021 | Scotney |
| 2022/0019695 A1 | 1/2022 | Scotney |

OTHER PUBLICATIONS

"Flashproxy: Transparently Enabling Rich Web Content via Remote Execution", Jun. 17-20, 2008, MobiSys'08, Breckenridge, Colorado, USA, retrieved from http://citeseerx.ist.psu.edu/viewdoc/download;jsessionid=159110DAEE75CBDD05764EBEC094321D?doi=10.1.1.143.6717&rep=rep1&type=pdf on Mar. 11, 2021. (Year: 2008) 13 Pages.

* cited by examiner ensure such characters of data elements for the data item are of a designated type or arrangement. By way of example, formats can coincide with a character string that is arranged to define a name (e.g., first and last name), phone number (e.g., sequence of 10 digits, with area code), electronic messaging identifier (e.g., email address), physical address, government identifier (e.g., social security number), health or demographic information, and various other types of information.

SELECTIVE REPLACEMENT OF DATA MAINTAINED BY THIRD-PARTY NETWORK SERVICES

RELATED APPLICATIONS

This application is a continuation-in-part of U.S. patent application Ser. No. 17/189,058, filed on Mar. 1, 2021, which is a continuation of U.S. patent application Ser. No. 16/221,261 (now U.S. Pat. No. 10,936,751), filed on Dec. 14, 2018; the aforementioned applications being hereby incorporated by reference in their respective entireties for all purposes.

FIELD OF THE INVENTION

Examples relate to data substitution, and more specifically, to selective replacement of data maintained by third-party network services.

BACKGROUND

Third-party network services, such as cloud, software as a service ("SaaS"), and web services, are used by enterprises and other customers to retain vast quantities of data of which some can often be subject to privacy or other confidentiality restrictions. For example, governmental regulations can specify that certain types of sensitive information, such as Electronic Protected Health Information (ePHI) or Personally Identifiable Information (PII) to be erased after such data is deemed "expired". In the context of third-party network services, eliminating data that is subject to such privacy of confidentiality restrictions is a technical challenge, as the data items (e.g., phone numbers, names, email addresses, etc.) that are subject to such restrictions are typically part of a larger data set (e.g., record), and simple deletion of a specific data item can cause inconsistencies within the larger data sets (e.g., within a record, or amongst a collection of records), making use of the larger data set problematic.

DETAILED DESCRIPTION

Figure 1:
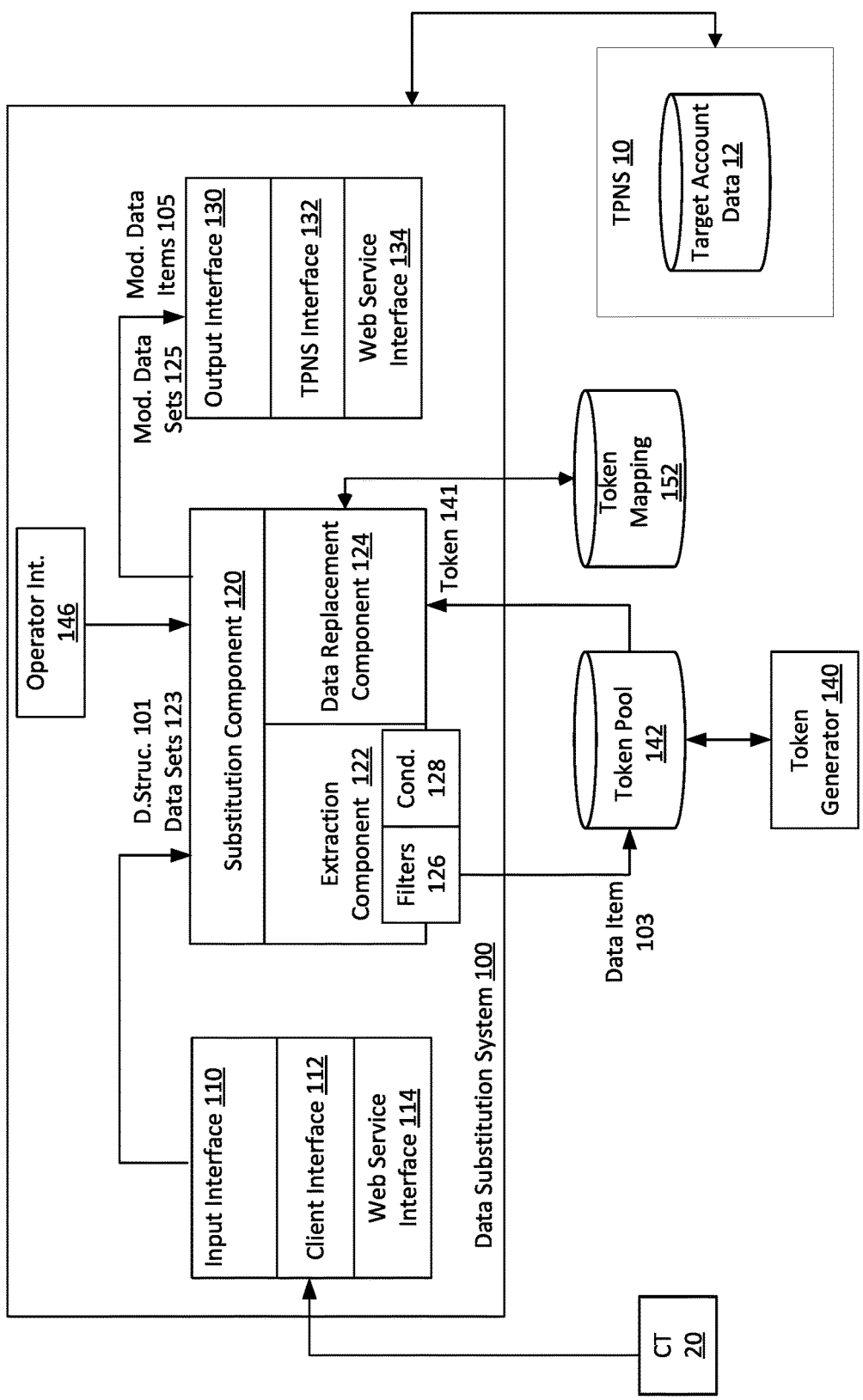
FIG. 1 illustrates a network computer system to selectively replace data for storage with a third-party network service.

A network computer system to selectively replace data items of a collection of data structures. As described by various examples, the network computer system can be implemented as a web service, intercept service, or combination thereof. In some examples, the network computer system replaces data items when one or more scripts execute in a backend scripting engine of a third-party network service.

According to examples, a network computer system identifies whether a respective data item of a data structure meets one or more conditions for replacement. In examples, in the context of data items, replacement includes substituting at least a portion of a data item having a format, referred to herein as the substituted data, with a token that also has a corresponding format. The substituted data may include a character string that matches a particular format. The replacement prevents the storage of the substituted data by a third-party network service, such as to prevent the storage of sensitive data by the third-party network service.

In examples, the network computer system may implement a reversible data substitution procedure, such as by storing a token mapping so that the original data item may be reconstructed by replacing the token with the substituted data.

As an addition or alternative, the network computer system may implement an irreversible data substitution procedure, such as for anonymization. In examples, to permanently anonymize the data, no token mapping is stored between the substituted data and the corresponding token.

The conditions may include a format condition in which at least a portion of the respective data item has a format that coincides with a designated or predetermined format. The network computer system may operate to replace a set of characters of the respective data item, where the data item has a format that coincides with the predetermined format. The network computer system can replace the identified set of characters with the string of characters of a respective token, where the token is uniquely generated and stored as part of a token pool. The network computer system can further cause the respective data to be stored by a respective third-party network service after substitution.

In examples, the network computer system may dynamically determine a format condition. For example, the network computer system may process input data and identify a recurring format as a candidate for data replacement. The network computer system may operate to replace a set of characters in one or more data items where the data has a format that coincides with the dynamically-identified format. After determining the dynamically-identified format, the network computer system may generate a token pool that includes unique tokens with the dynamically-identified format.

In examples, a data item refers to a collection of data elements (e.g., alphanumeric characters, special characters, etc.), such as provided by a sequence of characters that represent a name, a government identifier (e.g., social security number), a telephone number, credit card information, a physical address, an email or other messaging identifier, or predefined codes relating to health or demographic information. Data items can be a part of an underlying data structure, such as a record or document. In some examples, data items that are subject to replacement can exist in a structured form as part of a data structure (e.g., field value), or alternatively, as part of the content of a record or document.

The term "format" and its variants (e.g., "subformat"), in context of a data item, means one or more discernable characteristics relating to any one of (i) an individual constituent data element, (ii) a subportion or combination of constituent data elements, and/or (iii) the collective constituent data elements of the data item. In examples, a format can be defined by a set of rules that correlate to, or otherwise define a corresponding set of discernable characteristics of a type of data item. By way of examples, the rule set can define the format of a data item by (i) a character length of the data item and/or portion(s) of the data item (e.g., number of characters that comprise the data item or portion of the data item), (ii) type, presence or placement (e.g., sequential placement) of special characters (e.g., "@", "-", ".") within a series of characters that constitute the data item, (iii) a characteristic in the arrangement of data elements of the data item (e.g., data elements that are of a first type (e.g., alphabetical) are sequentially before data elements that are of another value type (e.g., numbering)), (iv) a type of value (e.g., alphabetical, numerical, special character, etc.) for any part of the data item, (v) a value range of a set of data elements that constitute the data item (e.g., between 01 and 12 to denote month of year on credit card), and/or (vi) a computational discerned characteristic as between data elements or portions of the data item, such as may be discernable through use of an algorithm (e.g., a checksum algorithm, such as the Luhn algorithm for credit card numbers).

A format of a data item is said to coincide with a format of a token if the format of the data item maps to, or is the same as the format of the token. Depending on implementation, for example, a data item may match to a format of a token if (i) the data item has the same number of characters, along with a same placement of a set of special characters as that of the token; or (ii) the data item is different in length, use or placement of special characters as compared to the token, but can be mapped to the format by a format rule (e.g., replace each character of the format with a byte value). As additional illustrative examples, the format of the data item and the token may coincide if, for example, a format of a portion of the data item (e.g., value range, type of value, arrangement characteristic, etc.) corresponds or otherwise maps to a corresponding portion of the token. As another example, the format of the data item and the token may also coincide if a computationally discerned characteristic is shared (e.g., checksum computation, in accordance with Luhn algorithm) between the data item and the token.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, servers, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Data Substitution System

FIG. 1 illustrates a network computer system to selectively replace data for storage with a third-party network service ("TPNS"). In examples, a data substitution system 100 is implemented using a network computer system, such as a server, or combination of servers. As described by various examples, the data substitution system 100 can replace portions of data structures that are transmitted from client terminals, servers or systems to the data substitution system 100 for storage with the TPNS 10. As an addition or variation, the data substitution system 100 can replace portions of data structures that are stored with TPNS 10, such that stored data structures are updated to reflect the replacement of select values. In such examples, the TPNS 10 can correspond to a cloud, SaaS or web service, and data structures that are subject to replacement by the data substitution system 100 can be associated with target account data 12 corresponding to a target account (e.g., enterprise or customer accounts).

The data substitution system 100 may implement an irreversible data substitution procedure, such as to anonymize the data. To permanently anonymize the data, no token mapping is stored between the substituted data and the corresponding token. As an addition or alternative, the data substitution system 100 may implement a reversible data substitution procedure, such as by storing information regarding a replacement operation so that the replacement operation on a data item may be reversed using the stored information. For example, the data substitution system 100 may store token mapping data 152 that associates a token and substituted data that originally appeared in one or more data items. The token mapping data 152 may be used to reconstruct an original data item from a modified data item by replacing a particular token appearing in the modified data item with the substituted data associated with the particular token.

According to examples, the data substitution system 100 includes one or more input interfaces 110, a substitution component 120, and one or more output interfaces 130. As described by examples, the substitution component 120 utilizes tokens 141 from a token pool 142 to replace at least a portion of select data items, for storage with the TPNS 10. Each of the input interface 110 and the output interface 130 can include a combination of processes, including processes to implement a REST, SOAP and/or client interface, as well as processes to retrieve and/or write data to the TPNS 10. For example, modified data items may be written to the TPNS 10 when a client terminal 20 submits a web form that includes data items. As another example, modified data items may be retrieved from the TPNS 10 when a client terminal 20 loads a web page that includes data items.

In examples, data substitution system 100 is implemented as part of an intercept service that replaces at least a portion of data sets, communicated from client terminals 20 or other entities, for storage with target account data 12 (e.g., enterprise account) of the TPNS 10. In such examples, the input interface 110 can include a client interface 112 to receive client communications. The client communications can be processed for data sets that are subjected to replacement, using the substitution component 120. The output interface 130 can include TPNS interface 132 to cause the TPNS 10 to store modified versions of the data sets with the target account data 12.

As another variation, the data substitution system 100 is implemented as a web-service to selectively replace account data that is stored with the target account data 12 of the TPNS 10. In such examples, a web service interface 114, 134 can be called or otherwise triggered by other programmatic components or processes, to retrieve data from a target location (e.g., target account data 12 of the TPNS 10). In examples, a web service interface 114, 134 can be triggered by a request from an enterprise (e.g., client terminal 20) and/or from the TPNS 10. For example, a script executing in the backend of the TPNS 10 may make a request to the web service interface 114, 134, as described in greater detail hereinafter with respect to FIG. 3.

Still further, in other examples, a web service interface 114, 134 can be triggered by a configuration or setting, such as based on a schedule or response to a predetermined event. By way of examples, (i) a web service interface 134 can be programmatically triggered to retrieve data sets 123 (e.g., all data sets that were created or modified before a specific date) from the target account data 12 on a monthly basis; and/or (ii) a web service interface 134 can be triggered to receive specific data sets 123 as part of a workflow that is initiated by a specific user or entity requesting replacement of a particular set of data (e.g., user requests to have their data anonymized and/or not stored at the TPNS 10). In such examples, the received data sets 123 are subject to replacement to generate modified versions of the data sets ("modified data sets 125"). The output interface 130 can utilize the TPNS interface 132 to update existing data sets of the target account data 12. In variations, the output interface 130 can include a web service interface 134 that returns modified data sets 125 to another entity (e.g., separate intercept service) or direct web service call, for storage with the target account data 12 of TPNS 10.

In some variations, the TPNS 10 can initiate or otherwise use the data substitution system 100 as a web service, by using, for example, a call request to trigger the input interface 110, passing the data sets 123 from the target account data 12 of TPNS 10. In such variations, the TPNS 10 can use a web service interface 134 to return modified data sets 125 to the TPNS 10.

In examples, the substitution component 120 includes an extraction component 122 to select data items 103 from respective data sets 123 for replacement, and a data replacement component 124 to replace data of the selected data items 103 with a randomly-generated and unique set of tokens.

In examples, the extraction component 122 can operate to extract data structures 101 from the data sets 123, and further to identify data items 103 within each identified data structure 101 which meets a condition, or set of conditions for replacement. An extracted data structure 101 can correspond to, for example, (i) a structured record in which respective data items 103 are field values of the record; or (ii) a document or file in which respective data items form part of the document's content (e.g., column or cell of a CSV file, delineated set of items in a text file, word of a document file, etc.), or (iii) the entire content of the document.

In some examples, the extraction component 122 includes a set of filters 126 that identify data items 103 designated portions of the respective data sets 123 for replacement. Each filter of the filter set 126 can identify a condition, or set of conditions, for identifying data items which are to be modified. For example, the filter set 126 can include one or multiple filters to identify one or more specific fields of a data record, where each identified field is pre-selected for replacement. In such examples, the filter set 126 can implement a format-driven replacement, by implementing the extraction component 122 to use the filter set 126 to identify the collection of data items 103 that are to be modified.

As an addition or alternative, the filter set 126 can include a second filter to identify data items of a particular format from a larger set of data. Each filter of the filter set 126 can, for example, identify a condition or rule for identifying a candidate set of character strings as being a data item of a predetermined type and/or a dynamically identified type. In examples, a condition for each filter can include (i) a length of the data item (e.g., 7 or 10 characters for phone number), (ii) a type of characters used by the data item (e.g., numbers for phone numbers), and/or (iii) presence of special markers in the character string. By way of example, character markers such as "P" or "PH:" or "Cell" can serve as a marker for a phone number, when the marker is followed by a series of characters that are numbers, in a given format (e.g., ten numbers formatted as X-XXX-XXX-XXXX or 1(XXX) XXX-XXXX, etc.). As another example, a character of "@" can mark an email address if the character marker is positioned in a string of characters that meet other conditions (e.g., . . . X@xxx.YYY where Y is one of the set of top-level domains, such as ".com", ".org", ".biz", or ".gov"). Similar conditions can be defined for other types of data items 103 which may be substituted, such as names, which can include special markers (e.g., "Mr.", "Ms." or "Mrs.") and formats.

Still further, the extraction component 122 can deploy the filter set 126 with an additional set of conditions 128, including rules or other logic. The additional conditions 128 can, for example, restrict the filters 126 to identifying data items that meet an additional criterion or set of criteria, such as an age of the data item (e.g., based on creation date, modification date or other associated metadata). As another example, the additional conditions 128 can be based on data that is not part of the data item 103 where the replacement is to occur. For example, the additional conditions can be applied to data items 103 that meet the conditions of the filter set 126, and further meet a value condition of a particular value of an associated data item. To illustrate, fields that represent Personal Identifiable Information ("PII") of a person can be identified as data items 103 for replacement if the additional condition of a check field (e.g., representing a corresponding input indicating a desire of the person in question or the value of some other field value (e.g., representing an age of the person in question) meets a predetermined threshold (e.g., above the age of 13).

In examples, the extraction component 122 is configured to dynamically generate one or more filters. For example, the extraction component 122 may identify a recurring pattern in input data items associated with a field of one or more data records. After identifying the recurring pattern, the extraction component 122 may create a dynamically-generated filter that corresponds to potentially sensitive data or other data that is suitable for substitution. In examples, an administrator may specify a particular field, and the extraction component 122 processes input data items associated with the particular field to identify recurring patterns and/or create the dynamically-generated filter. After creating the dynamically-generated filter, the extraction component 122 may use the dynamically-generated filter to identify data items which are to be modified.

In examples, the filter set 126 and the additional conditions 128 can be configurable by, for example, an administrator of the target account data 12, where the modified data is to be stored. The substitution component 120 can, for example, include an operator interface 146 to enable an administrator user to specify conditions for implementing filters or other rules by which data items 103 are selected for replacement.

To replace data of the selected data items 103, examples provide for the data replacement component 124 to use tokens 141 from a pre-existing token pool 142, where each token 141 is a cohesive and non-alterable sequence of values (e.g., characters), having a format that coincides with a format of the data item or portion thereof that is to be replaced by the particular token. The token pool 142 may be populated and replenished by a token generator 140, which can, based on implementation, be included with the data substitution system 100, or provided as a separate component.

In examples, the token generator 140 can generate tokens 141 for the token pool 142 that are unique, such that each generated token 141, whether created at inception of token pool 142 or at a later time for its replenishment, is unique from all other existing or previously used tokens 141 of the token pool 142. In examples, each token 141 of the token pool 142 can correspond to a string of characters that have a predetermined format. As an alternative or addition, each token of the token pool 142 may correspond to a string of characters that have a dynamically-identified format. For example, after a dynamically-identified format is created, the token generator 140 may generate tokens 141 for the token pool 142 that includes unique tokens with the dynamically-identified format.

The token pool 142 can include one or multiple collections of tokens, where the tokens of each collection have a respective format that coincides with a corresponding format of data items that are to be anonymized with the respective tokens. The tokens 141 of a given format can include characters that are randomly selected from a character library, which can include, depending on implementation, alphanumeric characters, including characters of one or more alphabets (e.g., Latin alphabet, Chinese alphabet, Arabic alphabet, Devanagari alphabet, etc.) or a customized convention. In examples, the data substitution system 100 replaces strings of characters of multiple formats, and the token generator 140 can maintain multiple token pools 142 for a plurality of formats.

The data replacement component 124 replaces data of select data items 103, as identified by the extraction component 122, with tokens 141 from the token pool 142, without losing structure or utility of the data structure 101 from which the data item 103 was extracted. In particular, the token generator 140 can generate tokens that have a format that coincides with the format of the type of data item 103 which is to be anonymized. By adhering the format of the tokens to that of the data item 103 that is to be anonymized, the substituted form of the data items (modified data item 105) can maintain its utility within the TPNS 10. Moreover, since the tokens 141 are generated to be unique over time from all other tokens, there is no risk that any given modified data item 105 will be inconsistent with another data item, as could otherwise occur if two data items from unrelated records inadvertently have the same value. In examples, the data replacement component 124 stores an association between a particular token and the corresponding substituted data that the particular token was used to replace. For example, the data replacement component 124 may maintain token mapping data 152 so that the association between the particular token and the corresponding substituted data may be used in the future, such as to generate the original data item 103 from the modified data item 105. In examples, the modified data items 105 can be used to generate an updated data set for associated data structure(s) of the target account data 12, residing the TPNS 10. The TPNS interface 132 can, for example, update respective records of the target account data 12 of TPNS 10 with modified data items 105 (or their respective data structures), meaning records and/or field values or updated with corresponding modified records and/or respective modified field values.

To illustrate, an enterprise network can be operated by an organization that has a policy to not use live PII production data in a SaaS environment. To protect the policy, the substitution component 120 can be configured to implement filters 126 and additional conditions 128 which identify PII-type information (e.g., phone numbers, names, email addresses) from a variety of data structures which the organization may use with the TPNS 10. If an employee uploads, for example, a CSV file or other data structure (e.g., text document) that contains some data items which qualify as PII-type information, the data substitution system 100 can intercept and inspect the CSV file. The substitution component 120 can use the filter set 126 and additional conditions 128 to extract data items contained in the file which qualify as PII-type information. The CSV file is then modified to replace the identified PII type information with similarly formatted character sequences, each of which correspond to a randomly generated, pre-existing and unique token. This data structure (e.g., CSV file) with the anonymized data is passed on to the TPNS 10.

As another illustration, an enterprise network can provide a feature that a user can select to replace data on demand in a live instance of the TPNS 10. For example, a user can edit an existing record by selecting a checkbox that specifies that data items of the record are to be modified. The user submits the record, and the data substitution system 100 intercepts the data, identifies the data as having a pre-configured format, and modifies the record by selectively replacing the PII fields with tokens 141. This modified record is then used to update a corresponding record maintained with the TPNS 10.

As described with various examples, modified data items 105 maintain their format. For example, when an email address is replaced by the data substitution system 100, the anonymized form the email address meets standard for email address format. For example, the substitution component 120 can alter the email address john.smith@example.com to "ab332.wwswe@fe23qpxm.csd"—the appropriate format for an email. The modified email address is acceptable to, for example, the TPNS 10, as it meets the relevant format requirements, whilst being constructed from one or more tokens.

Intercept Computer System

Figure 2:
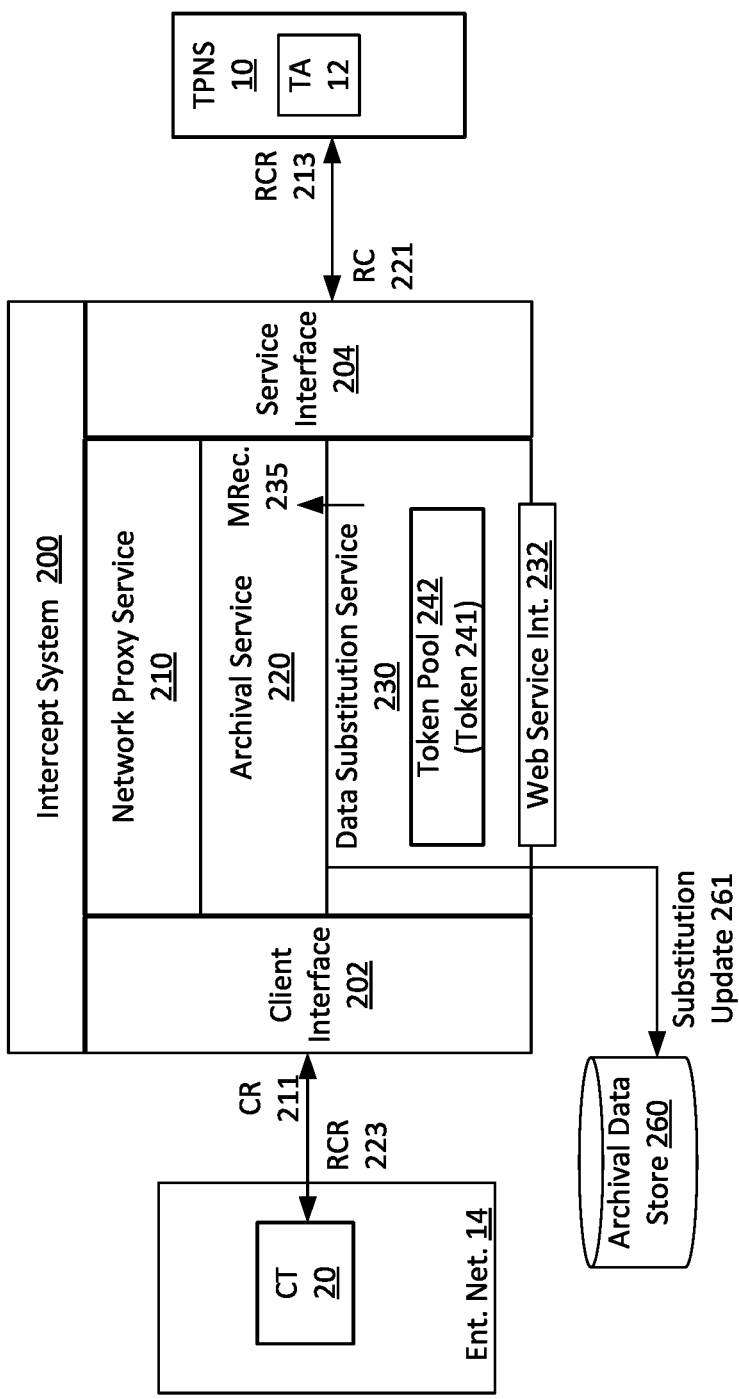
FIG. 2 illustrates an intercept computer system on which an example service is implemented.

FIG. 2 illustrates an intercept computer system on which an example service is implemented. In more detail, an intercept computer system 200 can be implemented using a network computing system, such as either a physical or virtual server, or combination of such servers, to receive and forward communications between the group of client terminals 20 and the third-party network service 10 ("TPNS 10"). Each of the client terminals 20 may correspond to, for example, an end user terminal, workstation or other computer system capable of communicating with the intercept system 200 over the World Wide Web and/or other data networks.

In examples, the intercept system 200 provides data replacement as an intercept service (represented by substitution service 230), as between client terminals 20 and the TPNS 10. The intercept system 200 may implement an irreversible data substitution procedure, such as to anonymize the data. As an addition or alternative, the intercept system 200 may implement a reversible data substitution procedure, such as by storing information regarding the replacement so that a replacement operation on a data item may be reversed using the stored information.

As an intercept service, the substitution service 230 can modify data extracted from client requests 211, before non-modified forms of the extracted data are communicated to the TPNS 10. While some examples provide for the substitution service 230 to be implemented as an intercept service, in variations, the substitution service 230 can be implemented as on-demand process that can retrieve data for substitution from the TPNS 10 as a response to a triggering event or condition. Such triggering events can be detected through use of other intercept services, such as described with some examples below. However, as described with some examples of FIG. 1, the substitution service 230 can also be implemented as a backend web service that can be called or otherwise utilized by, for substitution, an automated cloud or SaaS process (such as where target data for substitution may reside). As an addition or variation, the substitution service 230 can be called or otherwise utilized by a programmatic administrative component of the enterprise network 14. Still further, in some examples, the substitution service 230 can operate as a hybrid implementation (e.g., intercept-capable service), having processes for operating as both an intercept service and a programmatically driven or automated backend service. In addition, while the substitution service 230 is described as a service that may be separate or distinct from other services of the system 200, in variations, the substitution service 230 can be implemented as an integrated component or functional aspect of a larger service that includes functionality of one or more other services, such as described with examples provided below.

As illustrated by an example of FIG. 2, the intercept system 200 can implement the substitution service 230 with one or more additional intercept services. In examples, the intercept system 200 includes a client interface 202 to communicate with a set of client terminals 20, a service interface 204 to communicate with the TPNS 10, and one or multiple intercept or intercept-capable services. In an example as described, the services of the intercept system 200 includes a network proxy service 210, archival service 220 and the substitution service 230. As an addition or alternative, the substitution service 230 can be used with other types of proxy or intercept services, such as, for example, a traffic monitoring service, a policy enforcement service, and/or a content configuration service. Still further, as described with other examples, the substitution service 230 can be used as an independent intercept service.

In examples, the network proxy service 210 can proxy for client terminals 20 in a manner that facilitates the respective client terminals 20 in accessing account data residing on sub-domains of the TPNS 10. The network proxy service 210 can, for example, enable the client terminals 20 to utilize a single certificate that is issued by the network proxy service 210 to access domains and subdomains of the TPNS 10. In some examples, the network proxy service 210 can implement a link structuring scheme, in which client requests 211 that are intended for forwarding to the TPNS 10 are communicated with links that are structured ("packed links") in a manner that is specific to, for example, the domain of the network proxy service 210 ("proxy-domain specific structure"). The network proxy service 210 can restructure the packed links (or "unpack" the links) communicated with or as part of client requests 211, into a link structure that is native to the TPNS 10. In other words, the packed links of the client requests 211 can be unpacked to have the native structure of the TPNS 10, before the client requests 211 are forwarded to the TPNS 10 as restructured/unpacked client requests 213. As part of the proxy service, the network proxy service 210 can implement the link structuring scheme so that response communications 221 from the TPNS 10 are received in the native (or unpacked) structure of the TPNS 10, then restructured into the proxy-domain specific structure (i.e. "packed") before the response communications are forwarded to a respective client terminal 20 as restructured client responses 223.

As an example, the network proxy service 210 can receive (via the client interface 202) client requests 211 that specify links of the TPNS 10 in a packed structure, where the links in the packed structure include alternative syntax (e.g., "-" or hyphen) to identify sub-domains. The network proxy service 210 can parse URLs of individual client request 211 to identify the alternative syntax markers of the sub-domains, and to remove corresponding domain components from the respective links. The network proxy service 210 can also structure the syntax of the respective links to include a suffix proxy format. In examples, the network proxy service 210 restructures the links from the packed structure into an unpacked or native structure, where the alternative syntax of the packed links is replaced with target syntax (e.g., "." or dot) that is recognized by the TPNS 10 to designate, for example, subdomains of the TPNS 10. For response communications 221, the network proxy service 210 can parse the communication to identify an unpacked (or natively structured) link of the response communication 221. The network proxy service 210 can restructure the unpacked link into a packed structure, where, for example, alternative syntax (e.g., "-" or hyphen) is used to designate a subdomain portion of the individual links that specified or embedded in the response communication 221.

In providing the proxy service, some examples provide that the network proxy service 210 can also issue a single proxy-domain specific SSL certificate to each of the client terminals 20. The individual client terminals 20 can use the single proxy-domain specific SSL certificate for verification when sending client requests 211 and receiving client responses 223 from the TPNS 10. The network proxy service 210 can further store and utilize a collection of SSL certificates that are issued by, or for use with, the TPNS 10, in order to access sub-domains of the TPNS 10 on behalf of requesting client terminals 20. As a result, the network proxy service 210 can enable, for example, browsers running on the client terminals 20 to access domains and sub-domains of the TPNS 10, using a single proxy-domain specific certificate. The network proxy service 210 can receive and verify client requests 211 using the proxy-domain specific SSL certificate, then forward the client request 211 with the unpacked links to the TPNS 10, and use one or multiple stored SSL certificates of the TPNS 10 to access sub-domains specified or used with the client request 211. In this way, the network proxy service 210 can be implemented to enable the client terminals 20 to utilize browsers to have full access to the respective account's data collection, as hosted by the TPNS 10 (e.g., including domains and sub-domains), while alleviating burdensome certificate requisites that may otherwise be required from the TPNS 10.

Additionally, the intercept system 200 can include an archival service 220 that can selectively archive data sets in communications that the system receives and forwards as between client terminals 20 (e.g., operating as part of the enterprise network 14) and the TPNS 10. In examples, the archival service 220 can implement data filters to identify target data sets for archival. The archival service 220 can, for example, implement archive filters (not shown in FIG. 2) with the client interface 202 and/or service interface 204, to filter respective client requests 211 and/or response communications 221, from which archival can be extracted. As described by various examples, the archival service 220 can generate an archival data set for storage with an archival data store 260 that is independent of the TPNS 10.

In some examples, the archival data store 260 can be configured to store an archive representation of select portions of the target account data 12, such as portions of the account data that are pre-identified or deemed to be mission critical data for the respective enterprise account. The archival representation can include data that reflects a change or update to the target account data 12, as well as data that reflects a state of select data items that are pre-associated, or otherwise identified, as being relevant to the change or update. For example, the archival data representation can include data that reflect a field (e.g., cell of table) that is changed by a client request 211, as well as data that reflects other fields (e.g., other cells) that are pre-associated or are otherwise contextually relevant to the changed data item. In such examples, the other fields can be identified from, for example, one or more service response communications 221 that are made in context of the corresponding client request 211, such as during the client terminal's session, as well as prior to or in response to the client request 211 in which the data item is changed. The service response(s) can reflect, for example, a state or value of the other pre-associated data items at the time when the change resulting from the client request 211 is made to the target account data 12 of the TPNS 10.

According to some examples, the archival service 220 can be used in connection with the archival data store 260 being configured to be available to client terminal(s) 20, independent of the TPNS 10. Still further, in some variations, the archival data store 260 can reside within the enterprise network 14 of the client terminals 20, such that client terminals 20 can access the data subject to rules and policies of the enterprise, and independent of the TPNS 10. In variations, the archival data store 260 can be integrated with the intercept system 200, independently of the TPNS 10.

Additionally, the archival data representation(s) of the data of the target account data 12 can be generated from data included with the processed client requests 211 and/or service response communications 221. Still further, the archival service 220 can generate the archival data representation(s) of the target account's data exclusively from data extracted from client requests 211 and/or service response communications 221. In this way, the data of the archival data store 260 is generated without the intercept system 200 having to separately query the TPNS 10 for data from the target account data 12.

The substitution service 230 can be implemented using, for example, the data substitution system 100 of examples of FIG. 1. Accordingly, reference to components of FIG. 1 are intended to illustrate an example of functionality that can be implemented with respect to an example described. As an intercept service, the substitution service 230 can employ filters to identify select data items from client requests 211, for which data substitution processes can be triggered. The client requests 211 can specify, for example, write operations to store data in the target account data 12 of TPNS 10. When implemented as an intercept service, the substitution service 230 can identify, for example, a specific data structure or item, as part of the client requests 211. The substitution service 230 can implement an extraction process (e.g., using the extraction component 122) to identify which data items of the client request 211 meet one or more conditions for replacement. The substitution service 230 can further access a token store 242 to retrieve a token 241 for implementing the substitution process on select data items that are included in the client requests 211 and which meet the replacement condition(s). The substitution service 230 can use the token 241 to generate a modified form of the select data items without altering a format of the data set that contains the modified data items. In turn, the substitution service 230 can, through service interface 204, write and/or update a data structure (e.g., record or document) that corresponds to the data set of the client request 211. For example, the substitution service 230 can, through the service interface 204, update a TPNS record that is specified by the client request 211, with field values that have been modified by the substitution service 230.

As described with other examples, once modified, the records of the target account data 12 can be made to include field values that include randomly generated sequences of characters that replace the information that would otherwise be conveyed by those field values. While the modified data items do not contain the original portion of data that was replaced, the underlying data structures of those data items can retain their respective utility within the larger set of the target account data 12.

In examples, the services of the intercept system 200 can be integrated, with some services utilizing other services of the intercept system 200. For example, the substitution service 230 can use the network proxy service 210 to locate the subdomains where records or other data structures that coincide with data sets of the client requests 211. For example, the substitution service 230 can implement write-type operations to update select records of the client request 211 where data has been identified for substitution, as determined by the network proxy service 210.

In some examples, the substitution service 230 modifies records that are stored with the target account data 12 of TPNS 10, as well as corresponding data representations as stored with the archival data store 260. In this manner, the intercept system 200 can deploy substitution service 230 to modify archive data (e.g., such as archival data stored in the archival data store 260), as well as data that may be in otherwise active use as part of the target account data 12.

While some examples of FIG. 2 describe implementations in which the substitution service 230 modifies datasets identified from client request 211, the substitution service 230 can also be implemented as a backend service that can be used with the intercept computer system 200 and or/one or more intercept services, such as described. In some examples, the substitution service 230 can be implemented with a web service interface 232, to receive service calls or triggers from other processes or programmatic entities. The web service interface 232 can correspond to, for example, a Representation State Transfer (REST) interface. In examples in which the substitution service 230 is implemented as a hybrid, the substitution service 230 can process client requests 211 to identify data files, records or other structures that may be subject to substitution. The substitution service 230 can also be responsive to triggers, processes or other or other events, including to calls and/or instructions or data received through the web service interface 232.

Figure 3:
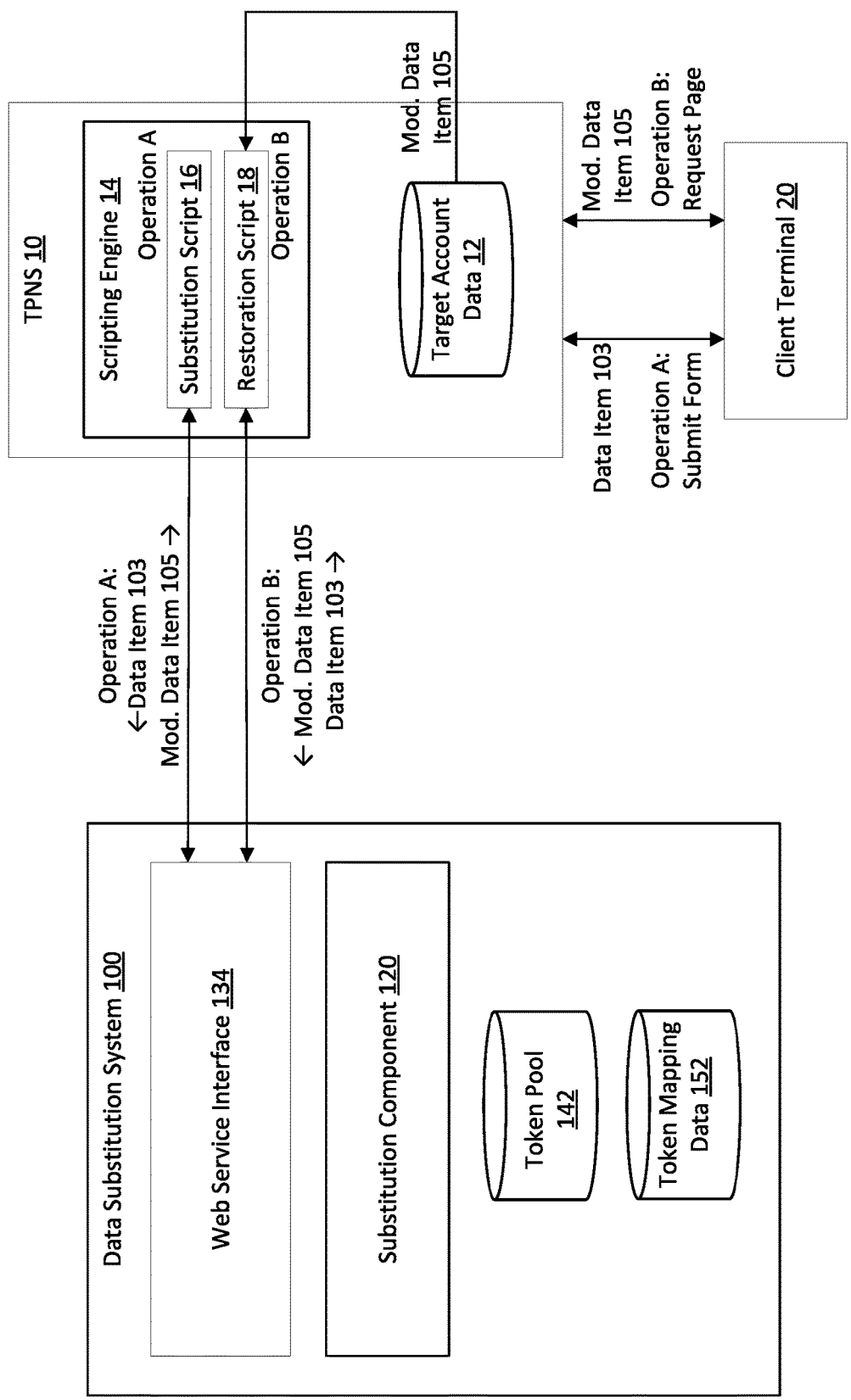
FIG. 3 illustrates a network computer system to selectively replace data for storage with a third-party network service when one or more programmatic components or processes are triggered at a third-party network service

FIG. 3 illustrates a network computer system to selectively replace data for storage with a third-party network service when one or more programmatic components or processes are triggered at a third-party network service. In examples, a data substitution system 100 is implemented using a network computer system, such as a server or combination of servers. The data substitution system 100 includes a web service interface 134. The web service interface 134 may be called or otherwise triggered by other programmatic components or processes. For example, Operation A and Operation B, each show the web service interface 134 being triggered by programmatic components or processes at the TPNS 10. In examples, the TPNS 10 may implement a backend scripting engine 14 that allows an enterprise associated with a target account to provide executable code, such as but not limited to substitution script 16 and restoration script 18, to execute in response to certain actions associated with the target account.

Operation A is initiated when a web form is submitted at a client terminal 20. The web form includes a data item 103 containing sensitive information. The TPNS 10 handles the submission of the data item 103 in the web form by submitting a request to the web service interface 134 of the data substitution system 100. In examples, the TPNS 10 automatically submits the request when a script is executed in the backend of the TPNS 10.

In examples, the substitution script 16 executes automatically in response to submission of the web form by the client terminal 20. When the substitution script 16 executes, the TPNS 10 submits a request comprising the data item 103 to the web service interface 134. In examples, the request may include additional data, such as additional portions of the web form data. In response to the request, the substitution component 120 identifies data to substitute that includes at least a portion of the data item 103 to be replaced, selects a token from the token pool 142, and stores a mapping associating the token and the substituted data in the token mapping data 152. The substituted data may include a character string that matches a particular format, and the token also has the particular format. The data substitution system 100 generates and returns a modified data item 105 to the TPNS 10 in response to the request. As an alternative, the web service interface 134 may respond with data necessary for the TPNS 10 to generate the modified data item 105. The substitution script 16 replaces the data item 103 with the modified data item 105 so that the modified data item 105 is stored in the target account data 12 of the TPNS 10 instead of the data item 103.

Operation B is initiated when a web page is requested by the client terminal 20. The web page is intended to include the originally submitted data item 103, which is not stored at the target account data 12 maintained by the TPNS 10. The TPNS 10 handles the web page request by submitting a request to the web service interface 134 of the data substitution system 100. In examples, the TPNS 10 automatically submits the request when a script is executed in the backend of the TPNS 10, such as the restoration script 18.

In examples, the restoration script 18 executes automatically in response to web page request by the client terminal 20. When the restoration script 18 executes, the TPNS 10 submits a request comprising the modified data item 105 to the web service interface 134. In examples, the request may include additional data, such as a portion of the web page requested by the client terminal 20 that includes the modified data item 105. In response to the request, the substitution component 120 identifies a token in the modified data item 105, retrieves an association between the token and the corresponding substituted data in the token mapping data 152, and replaces the token in the modified data item 105 with the substituted data to restore the original data item 103. The substituted data may include a character string that matches a particular format, and the token also has the particular format. The data substitution system 100 returns data including the restored data item 103 to the TPNS 10 in response to the request. As an alternative, the web service interface 134 may respond with data necessary for the TPNS 10 to generate the restored data item 103. When the web page is served to the client terminal 20, the web page includes the restored data item 103 even though the data item 103 is not stored in the target account data 12 of the TPNS 10.

Methodology

Figure 4A:
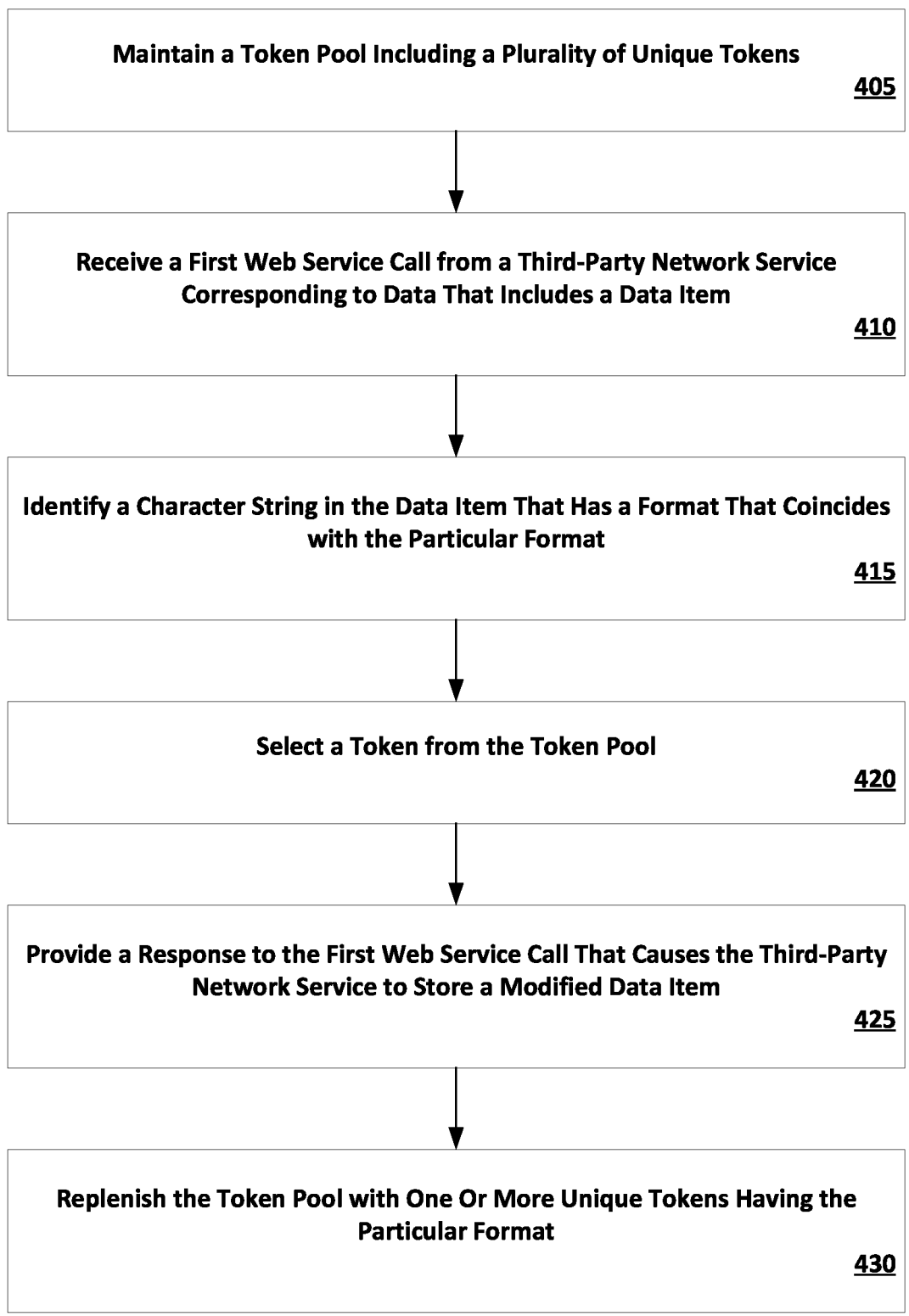
FIGS. 4A-4B illustrate example methods for implementing a data replacement service for use with a third-party network service.
Figure 4B:
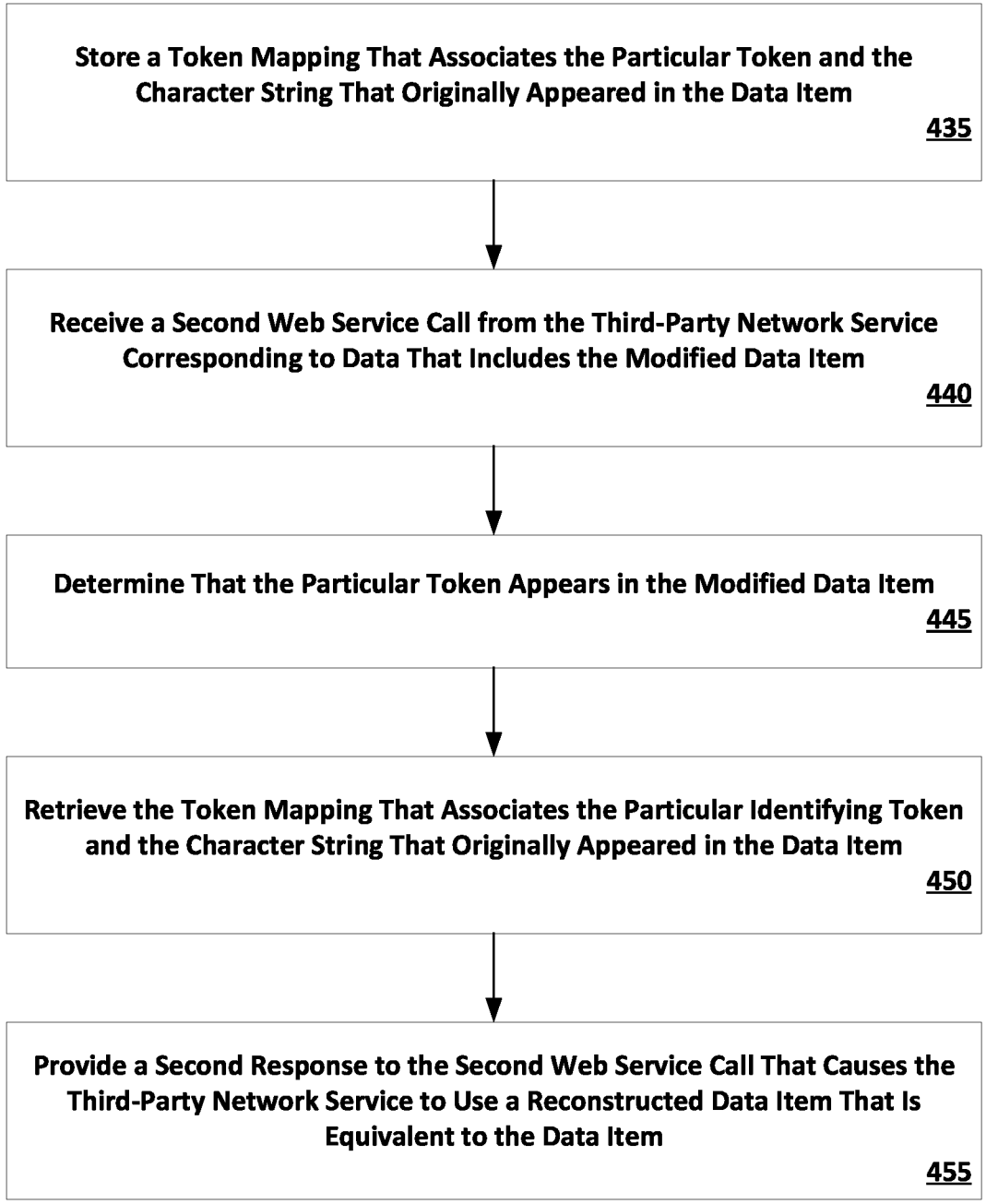

FIGS. 4A-4B illustrate example methods for implementing a data replacement service for use with a third-party network service. A method such as described with examples of FIGS. 4A-4B can be implemented using, for example, a network computer system, such as described with examples of FIGS. 1-3. Accordingly, reference may be made to elements of FIG. 1-3 for purpose of implementing a step or sub-step being described.

With reference to an example of FIG. 4A, a data substitution system 100 maintains a token pool including a plurality of unique tokens (405). Each unique token includes a string of characters having a particular format. The data substitution system 100 receives a first web service call from a third-party network service (TPNS) 10 (410). The first web service call corresponds to data that includes a data item. The first web service call may be triggered by programmatic components or processes at the TPNS 10. In examples, the first web service call is triggered by a first script that executes in a backend scripting engine of the TPNS 10. For example, the first script may be configured to execute in response to submission of a web form to the TPNS 10 by a client terminal associated 20 with a target account.

The data substitution system 100 identifies a character string in the data item that has a format that coincides with the particular format (415). The data substitution system 100 selects a token from the token pool (420). The data substitution system 100 provides a response to the first web service call that causes the TPNS 10 to store a modified data item (425). The modified data item is generated by replacing the character string in the data item with the token. In examples, the first web service call includes the data item, and the response includes the modified data item. As an alternative, the TPNS (10) may receive and use the token to generate the modified data item.

The data substitution system 100 replenishes the token pool with one or more unique tokens having the particular format. In examples, method of FIG. 4A is used for irreversible data anonymization, reversible data substitution, or the combination thereof.

In examples, method of FIG. 4B is used for reversible data substitution. With reference to an example of FIG. 4B, the data substitution system 100 stores a token mapping that associates the token selected from the token pool with the character string that originally appeared in the data item (435).

The data substitution system 100 receives a second web service call from the TPNS 10 (440). The second web service call corresponds to data that includes the modified data item. The second web service call may be triggered by programmatic components or processes at the TPNS 10. In examples, second web service call is triggered by a second script that executes in a backend scripting engine of the TPNS 10. For example, the second script may be configured to execute in response to a request from a client terminal 20 associated with a target account to the TPNS 10, for a web page that displays the data item.

The data substitution system 100 determines that the particular token appears in the modified data item (445). The data substitution system 100 retrieves the token mapping that associates the particular identifying token and the character string that originally appeared in the data item (450). The data substitution system 100 provides a second response to the second web service call that causes the TPNS 10 to use a reconstructed data item that is equivalent to the data item (455). The reconstructed data item is generated by replacing the token with the character string from the token mapping.

Hardware Diagram

Figure 5:
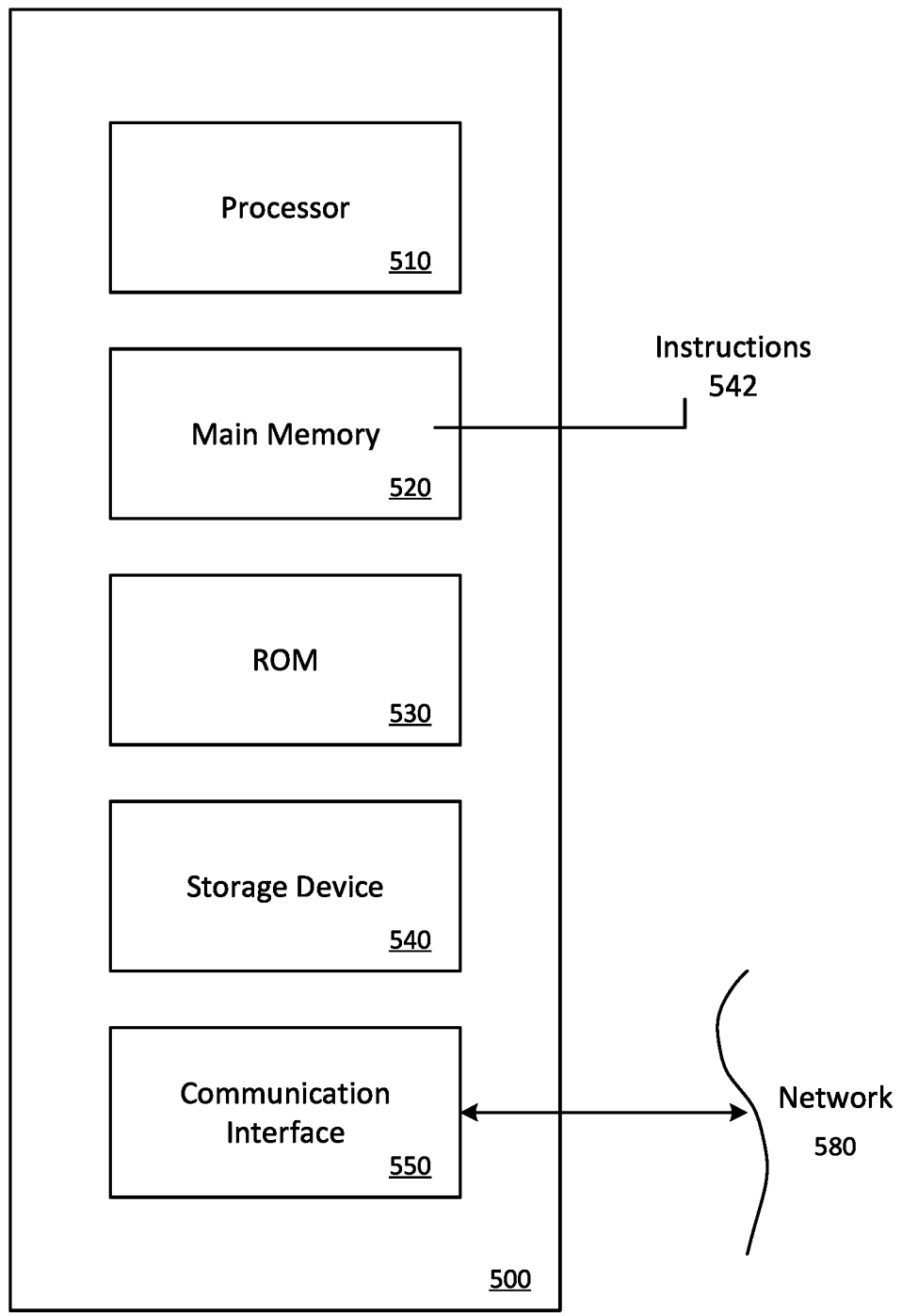
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1 and/or FIG. 3, the data substitution system 100 can be implemented using a computer system such as described by FIG. 5. Likewise, in the context of FIG. 2, the intercept system 200 can be implemented using a computer system such as described with an example of FIG. 5. Additionally, a method such as described with an example of FIG. 4 can be implemented using a computer system such as described with an example of FIG. 5. Still further, examples of FIG. 1, FIG. 2, FIG. 3, and/or FIG. 4 can be implemented using a combination of multiple computer systems as described by FIG. 5.

In one implementation, a computer system 500 includes processor(s) 510, a main memory 520, a read only memory (ROM) 530, a storage device 540, and a communication interface 550. The computer system 500 includes the at least one processor 510 for processing information and executing instructions stored in the main memory 520. The main memory 520 can correspond to, for example, a random-access memory (RAM) or other dynamic storage device, for storing information and instructions to be executed by the processor 510. The main memory 520 can also be used for storing temporary variables or other intermediate information during execution of instructions to be executed by the processor 510. The computer system 500 may also include the ROM 530 and/or other static storage device for storing static information and instructions for the processor 510. A storage device 540, such as a magnetic disk, solid state drive or optical disk, can be provided to store data sets, such as provided by the archival data store 260. The main memory 520 can store instructions 542 for implementing a data anonymization system or service, such as described with examples of FIG. 1 or FIG. 2. Additionally, the processor 510 can execute the instructions 542 to implement a method such as described with an example of FIG. 3.

The communication interface 550 can enable the computer system 500 to communicate with one or more networks 580 (e.g., cellular network) through use of the network link (wireless or wireline). Using the network link, the computer system 500 can communicate with, for example, client terminals 20, servers and one or more third-party network services 10.

Examples described herein are related to the use of the computer system 500 for implementing the techniques described herein. According to one embodiment, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system implementing a web service, the network computer system comprising:
one or more processors;
one or more memory resources storing a set of instructions, that, when executed by the one or more processors, cause the one or more processors to:
maintain a token pool including a plurality of unique tokens, each unique token comprising a string of characters having a particular format corresponding to a format of data to be replaced;
receive a first web service call from a third-party network service, the first web service call corresponding to data that includes a data item;
identify a character string in the data item that has a format that coincides with the particular format;
select a token from the token pool to replace the character string in the data item and remove the token from the token pool;
provide a response to the first web service call that causes the third-party network service to store a modified data item, where the modified data item is generated by replacing the character string in the data item with the token;
receive a second web service call from the third-party network service, the second web service call corresponding to data that includes the modified data item comprising the particular token; and
provide a second response to the second web service call that causes the third-party network service to use a reconstructed data item that is equivalent to the data item, where the reconstructed data item is generated by replacing the token with the character string.

2. The network computer system of claim 1:
wherein the first web service call includes the data item; and
wherein the response includes the modified data item.

3. The network computer system of claim 1, wherein the first web service call is triggered by programmatic components or processes at the third-party network service.

4. The network computer system of claim 1, wherein the first web service call is triggered by a first script that executes in a backend scripting engine of the third-party network service.

5. The network computer system of claim 4, wherein the first script is configured to execute in response to submission of a web form to the third-party network service by a client terminal associated with a target account.

6. The network computer system of claim 1, wherein the data item includes sensitive data, wherein the modified data item stored by the third-party network service does not include the sensitive data.

7. The network computer system of claim 1, wherein, the instructions, when executed by the one or more processors, cause the one or more processors to:
store a token mapping that associates the token selected from the token pool with the character string that originally appeared in the data item.

8. The network computer system of claim 7, wherein, the instructions, when executed by the one or more processors, cause the one or more processors to:
retrieve the token mapping that associates the token selected from the token pool and the character string that originally appeared in the data item, wherein
the reconstructed data item is generated using the token mapping.

9. The network computer system of claim 8:
wherein the second web service call includes the modified data item;
wherein the second response includes the reconstructed data item.

10. The network computer system of claim 8, wherein the second web service call is triggered by a second script that executes in a backend scripting engine of the third-party network service.

11. The network computer system of claim 10, wherein the second script configured to execute in response to a request from a client terminal associated with a target account to the third-party network service, for a web page that displays the data item.

12. The network computer system of claim 1, wherein replacing the character string in the data item with the token is irreversibly performed for anonymization.

13. The network computer system of claim 1, wherein the web service conforms to Simple Object Access Protocol (SOAP).

14. The network computer system of claim 1, wherein the web service includes a Representation State Transfer (REST) interface.

15. A method for selectively anonymizing individual data items of a plurality of data structures, the method being implemented by one or more processors and comprising:
maintaining a token pool including a plurality of unique tokens, each unique token comprising a string of characters having a particular format corresponding to a format of data to be replaced;
receiving a first web service call from a third-party network service, the first web service call corresponding to data that includes a data item;
identifying a character string in the data item that has a format that coincides with the particular format;
selecting a token from the token pool to replace the character string in the data item and removing the token from the token pool;
providing a response to the first web service call that causes the third-party network service to store a modified data item, where the modified data item is generated by replacing the character string in the data item with the token;
receiving a second web service call from the third-party network service, the second web service call corresponding to data that includes the modified data item comprising the particular token; and
providing a second response to the second web service call that causes the third-party network service to use a reconstructed data item that is equivalent to the data item, where the reconstructed data item is generated by replacing the token with the character string.

16. The method of claim 15, wherein the first web service call is triggered by a first script that executes in a backend scripting engine of the third-party network service.

17. The method of claim 15, wherein the method includes storing a token mapping that associates the token selected from the token pool with the character string that originally appeared in the data item.

18. The method of claim 17, wherein, the method includes:
retrieving the token mapping that associates the token selected from the token pool and the character string that originally appeared in the data item, wherein
the reconstructed data item is generated using the token mapping.

19. A non-transitory computer readable medium that stores instructions, which when executed by one or more processors of a computer system, cause the computer system to perform operations that include:
maintaining a token pool including a plurality of unique tokens, each unique token comprising a string of characters having a particular format corresponding to a format of data to be replaced;
receiving a first web service call from a third-party network service, the first web service call corresponding to data that includes a data item;
identifying a character string in the data item that has a format that coincides with the particular format;
selecting a token from the token pool to replace the character string in the data item and removing the token from the token pool;
providing a response to the first web service call that causes the third-party network service to store a modified data item, where the modified data item is generated by replacing the character string in the data item with the token;
receiving a second web service call from the third-party network service, the second web service call corresponding to data that includes the modified data item comprising the particular token; and
providing a second response to the second web service call that causes the third-party network service to use a reconstructed data item that is equivalent to the data item, where the reconstructed data item is generated by replacing the token with the character string.

20. The non-transitory computer readable medium of claim 19, wherein the instructions, when executed by the one or more processors, cause the computer system to perform operations that include:
    storing a token mapping that associates the token selected from the token pool with the character string that originally appeared in the data item.

\* \* \* \* \*